(12) United States Patent
Krull et al.

(10) Patent No.: US 6,458,174 B1
(45) Date of Patent: Oct. 1, 2002

(54) COPOLYMERS, AND THEIR USE AS ADDITIVES FOR IMPROVING THE COLD-FLOW PROPERTIES OF MIDDLE DISTILLATES

(75) Inventors: Matthias Krull; Waltraud Nagel, both of Oberhausen (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/487,066

(22) Filed: Jan. 19, 2000

(30) Foreign Application Priority Data

Jan. 19, 1999 (DE) .......................... 199 01 803

(51) Int. Cl.[7] ............................................. C10L 1/18
(52) U.S. Cl. .......................... 44/393; 44/397; 526/320; 526/321; 526/322; 526/323; 526/324
(58) Field of Search ................................. 526/320, 321, 526/322, 323, 324; 44/393, 397

(56) References Cited

U.S. PATENT DOCUMENTS

| | | | |
|---|---|---|---|
| 2,542,542 A | | 2/1951 | Lippincott et al. |
| 3,048,479 A | | 8/1962 | Ilnyckyj et al. |
| 3,531,440 A | * | 9/1970 | Mehmedbasick ........ 525/327.9 |
| 3,981,850 A | | 9/1976 | Wisotsky et al. |
| 4,087,255 A | | 5/1978 | Wisotsky et al. |
| 4,613,679 A | * | 9/1986 | Mainord .................... 560/190 |
| 4,931,197 A | * | 6/1990 | Beck .......................... 526/320 |
| 5,093,019 A | * | 3/1992 | Tagawa et al. ............. 526/324 |
| 5,792,729 A | * | 8/1998 | Harrison et al. ............ 508/192 |

FOREIGN PATENT DOCUMENTS

| | | |
|---|---|---|
| DE | 1 147 799 | 4/1963 |
| DE | 1 914 756 | 11/1969 |
| DE | 2 050 071 | 4/1971 |
| EP | 0 153 176 | 8/1985 |
| EP | 0 214 786 | 3/1987 |
| GB | 1 317 899 | 5/1973 |
| GB | 1 468 588 | 3/1977 |
| GB | 1 469 016 | 3/1977 |
| WO | WO 90/03359 | 4/1990 |
| WO | WO 95/07944 | 3/1995 |

OTHER PUBLICATIONS

Derwent Patent Family Abstract For WO 95/07944 Mar. 23, 1995.

* cited by examiner

*Primary Examiner*—Cephia D. Toomer
(74) *Attorney, Agent, or Firm*—Susan S. Jackson; Scott E. Hanf

(57) ABSTRACT

Copolymers containing

A) from 45 to 54 mol % of divalent structural units of the formula 1

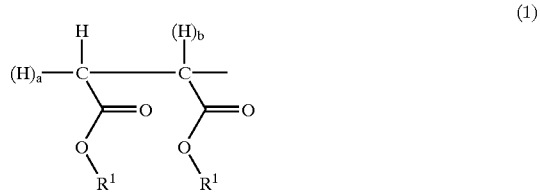

(1)

in which a and b=0 or 1 and a+b=1,

B) from 35 to 53 mol % of divalent structural units of the formula 2

$$-H_2C-CHR^2- \quad (2)$$

and

C) from 1 to 25 mol % of divalent structural units derived from polyolefins, where the polyolefins can be derived from monoolefins having 3 to 5 carbon atoms, wherein a) $R^1$ is an alkyl or alkenyl radical having 10 to 40 carbon atoms or an alkoxyalkyl radical having 1 to 100 alkoxy units and 1 to 30 carbon atoms in the alkyl radical, and b) $R^2$ is an alkyl radical having 10 to 50 carbon atoms, c) the alkylvinylidene content of the polyolefins on which the structural units C) are based is at least 50 mol %, and d) the number of carbon atoms in the polyolefin molecules on which the structural units C) are based is from 35 to 350.

8 Claims, No Drawings

COPOLYMERS, AND THEIR USE AS ADDITIVES FOR IMPROVING THE COLD-FLOW PROPERTIES OF MIDDLE DISTILLATES

FIELD OF THE INVENTION

The present invention is described in the German priority application No. 199 01 803.0 filed Jan. 19, 1999.

DESCRIPTION OF THE RELATED ART

The present invention relates to copolymers containing structural units of olefins, modified maleic anhydride and polyolefins, and to their use as additives to fuel oils for improving their cold-flow properties.

Crude oils and middle distillates obtained by distillation of crude oils, such as gas oil, diesel oil or heating oil, contain, depending on the origin of the crude oils, various amounts of n-paraffins, which, when the temperature is reduced, crystallize out as platelet-shaped crystals and in some cases agglomerate with inclusion of oil. This results in an impairment in the flow properties of these oils or distillates, which can result, for example, in problems during recovery, transport, storage and/or use of the mineral oils and mineral oil distillates. In the case of mineral oils, this crystallization phenomenon can result in deposits on the pipe walls during transport through pipelines, especially in winter, and in individual cases, for example during shutdown of a pipeline, can even result in complete blockage thereof. Precipitation of paraffins can also cause difficulties during storage and further processing of mineral oils. Thus, it may under certain circumstances be necessary to store the mineral oils in heated tanks in winter. In the case of mineral oil distillates, crystallization can result in blockage of the filters in diesel engines and furnaces, preventing reliable metering of the fuel oils and possibly resulting in total interruption of the fuel or heating medium supply. Besides the classical methods of removing crystallized-out paraffins (thermal, mechanical or using solvents), which merely relate to the removal of precipitations which have already occurred, recent years have seen the development of chemical additives (so-called flow improvers or paraffin inhibitors), which, through physical interaction with the precipitating paraffin crystals, result in their shape, size and adhesion properties being modified. The additives act here as additional crystal nuclei and partially crystallize out with the paraffins, resulting in a relatively large number of relatively small paraffin crystals having a modified crystal shape. Part of the action of the additives is also explained by dispersion of the paraffin crystals. The modified paraffin crystals have a lower tendency toward agglomeration, and consequently the oils to which these additives have been added can still be pumped and processed at temperatures which are frequently more than 20° lower than in the case of oils to which no additives have been added.

The flow and low-temperature behavior of mineral oils and mineral oil distillates is described, inter alia, by indicating the cloud point (determined in accordance with ISO 3015), the pour point (determined in accordance with ISO 3016) and the cold filter plugging point (CFPP; determined in accordance with EN 116). These parameters are measured in ° C.

Typical flow improvers for crude oils and middle distillates are copolymers of ethylene with carboxylic esters of vinyl alcohol. Thus, according to DE-A-11 47 799, oil-soluble copolymers of ethylene and vinyl acetate having a molecular weight of from about 1000 to 3000 are added to petroleum distillate fuels having a boiling point of from about 120 to 400° C. Preference is given to copolymers containing from about 60 to 99% by weight of ethylene and from about 1 to 40% by weight of vinyl acetate. They are particularly effective if they have been prepared by free-radical polymerization in an inert solvent at temperatures of from about 70 to 130° C. and pressures of from 35 to 2100 atmospheres above atmospheric pressure (DE-A-19 14 756).

The prior art furthermore discloses so-called comb polymers, which are derived from ethylenically unsaturated monomers having relatively long (for example $C_8$–$C_{30}$), preferably linear, alkyl radicals. These are employed in particular in relatively high-boiling, paraffin-rich mineral oils, if desired in combination with ethylene copolymers, for improving the cold-flow properties (for example GB-A-1, 469,016 and EP-A-0 214 786). According to EP-A-0 153 176, comb polymers containing $C_{12}$–$C_{14}$-alkyl radicals are also employed in narrow-cut distillates having, for example, 90-20% distillation ranges <100° C. and final boiling points of about 340–370° C. According to U.S. Pat. No. 2,542,542 and GB-A-1,468,588, copolymers of maleic anhydride (MA) and α-olefins which have been esterified by means of long-chain fatty alcohols are employed for treating crude oils.

EP-A-0 719 290 discloses a copolymer of a monoethylenically unsaturated carboxylic acid having 4 to 6 carbon atoms, an oligomer of propene or a branched α-olefin having 4 to 10 carbon atoms and a further monoethylenically unsaturated compound which is copolymerizable with said compounds. Reaction thereof with an amine gives oil-soluble reaction products which are suitable as additives for lubricant oils and motor fuels. The document does not disclose any composition comprising a maleic ester, a polyolefin and an α-olefin.

WO-90/03359 discloses copolymers of polyolefins having more than 32 carbon atoms and olefinically unsaturated carboxylic acids or derivatives. However, the esters mentioned in the documents are not specified.

DE-A-2 050 071 discloses copolymers of an ethylenically unsaturated dicarboxylic acid or derivatives thereof with an α-olefin having at least 20 carbon atoms which have been esterified by means of fatty alcohols. However, the document does not disclose, for example, any polyolefins as comonomers for the copolymers.

According to, for example, DE-A-2 050 071 and EP-A-214 786, the preferred process for the preparation of the copolymers is solvent-free bulk polymerization of MA and α-olefins, giving high-molecular-weight copolymers, followed by esterification. However, the copolymers of MA and α-olefins as intermediate for the additives prepared therefrom by esterification using fatty alcohols have increased rigidity owing to their high molecular weights. It is evident from such high viscosities and solidification points that the polymers can only be handled at elevated temperatures. For this reason, their processing, formulation and storage must take place at elevated temperature, or a solution of them in a suitable solvent must be prepared immediately after their preparation process.

The object of the present invention was thus to find an effective cold-flow improver for mineral oils (crude oils and middle distillates) based on esterified dicarboxylic acids and linear α-olefins which is nevertheless processable at lower temperatures.

SUMMARY OF THE INVENTION

Surprisingly, it has been found that incorporation of certain amounts of branched polyolefins does not impair the effectiveness of the esters as cold-flow improvers, but significantly simplifies handling of the solvent-free terpolymers carrying anhydride groups. Furthermore, the solubility of the additives in the oil to which they are to be added and the stability of the additive concentrates and their blends with other polymers employed as oil additives, such as, for example, EVA copolymers, are also improved.

The invention relates to copolymers containing

A) from 45 to 54 mol % of divalent structural units of the formula 1

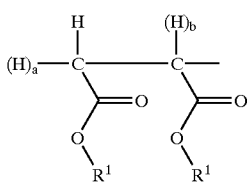

in which a and b=0 or 1 and a+b=1,

B) from 35 to 53 mol % of divalent structural units of the formula 2

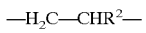 (2)

and

C) from 1 to 25 mol %, preferably from 1 to 20 mol %, of divalent structural units derived from polyolefins, where the polyolefins can be derived from monoolefins having 3 to 5 carbon atoms, wherein
   a) $R^1$ is an alkyl or alkenyl radical having 10 to 40 carbon atoms or an alkoxyalkyl radical having 1 to 100 alkoxy units and 1 to 30 carbon atoms in the alkyl radical, and
   b) $R^2$ is an alkyl radical having 10 to 50 carbon atoms,
   c) the alkylvinylidene content of the polyolefins on which the structural units C) are based is at least 50 mol %, and
   d) the number of carbon atoms in the polyolefin molecules on which the structural units C) are based is from 35 to 350.

DESCRIPTION OF THE PREFERRED EMBODIMENTS

The compounds on which the structural units of the formula 1 are based are esters of maleic, fumaric or itaconic acid. The preferred chain lengths for the radical $R^1$ depend on the intended use of the copolymers. If the copolymer is to be used as cold-flow improver for middle distillates, $R^1$ is an alkyl radical preferably having 10 to 24 carbon atoms, in particular 12 to 20 carbon atoms. Besides the use of individual alcohols $R^1$—OH, the use of alcohol mixtures, for example of dodecanol and tetradecanol or tetradecanol and hexadecanol in a ratio of from 1:10 to 10:1, in particular from 3:1 to 1:3, has proven particularly successful. By varying the alcohol component, the additive can be matched to the oil to be treated. Thus, for example, addition of, for example, 15% by weight of behenyl alcohol to the above-mentioned mixtures allows the effectiveness to be optimized in oils having an extremely high final boiling point of >390° C., in particular >410° C. If the copolymer is to be used as a pour point depressant, for example in crude oils and residue oils, radicals $R^1$ having 16 to 40 carbon atoms, preferably 16 to 30 carbon atoms, have proven particularly suitable. The radicals $R^1$ may be linear or branched, where the branch can include a secondary or tertiary carbon atom.

Linear radicals $R^1$ are preferred. If $R^1$ is branched, it preferably carries this branch in the 2-position. It is possible to use different radicals $R^1$, i.e. to use mixtures of different alcohols in the preparation of the maleic, itaconic and/or fumaric esters. Preferred alcohols $R^1$—OH are, for example, 1-decanol, 1-dodecanol, 1-tridecanol, isotridecanol, 1-tetradecanol, 1-hexadecanol, 1-octadecanol, eicosanol, docosanol, tetracosanol, mixtures thereof, and naturally occurring mixtures, such as, for example, coconut fatty alcohol, tallow fatty alcohol and behenyl alcohol. The alcohols may be of natural or synthetic origin.

In a further preferred embodiment, the radicals $R^1$ are alkoxyalkyl radicals of the formula 3

in which A is a $C_2$–$C_4$-alkylene radical, x is an integer from 1 to 100, and $R^3$ is a $C_1$–$C_{30}$-alkyl radical. The (O—A) unit is preferably an ethoxy or propoxy unit. If alkoxylated units of the formula (3) are used for $R^1$, this preferably takes place in a mixture with radicals $R^1$ which are not alkoxylated. The proportion of alkoxylated radicals $R^1$ preferably does not exceed 20 mol % (based on all radicals $R^1$). $R^3$ may be linear or branched. If $R^3$ is branched, the branch is preferably in the 2-position. $R^3$ is preferably linear.

The structural units of the formula 2 are derived from α-olefins. These α-olefins have 10 to 50 carbon atoms, preferably 12 to 40 carbon atoms. The carbon chain of the α-olefins may be linear or branched, preferably linear. Examples of suitable olefins are 1-dodecene, 1-tetradecene, 1-tridecene, 1-hexadecene, 1-heptadecene, 1-octadecene, 1-nonadecene, 1-eicosene, 1-hemicosene, 1-docosene, 1-tetracosene, 1-hexacosene, 1-octacosene, etc., and mixtures thereof. Also suitable are commercially available olefin fractions, such as, for example, $C_{20}$–$C_{24}$- or $C_{30+}$-olefins. Here too, the choice of olefin is dependent on the intended use. While short-chain olefins in the $C_{14}$–$C_{22}$ range give the best results in middle distillates, crude oils and residue oils require long-chain olefins, such as, for example, $C_{20}$–$C_{24}$- or $C_{30+}$-olefin fractions.

The structural units mentioned under C) are derived from polyolefins which can be derived from monoolefins having 3, 4 or 5 carbon atoms. Particularly preferred monoolefins as parent structures of the polyolefins are propylene and isobutylene, from which polypropylene and polyisobutylene are formed as polyolefins. The polyolefins preferably have an alkylvinylidene content of at least 50 mol %, in particular at least 70 mol %, especially at least 75%. The polyolefins which do not undergo free-radical polymerization remain in the product as non-copolymerized constituents, which also has a positive effect on the miscibility of the esters and their mixtures with other polymers. The alkylvinylidene content is taken to mean the content in the polyolefins of structural units based on compounds of the formula 4

in which $R^4$ or $R^5$ is methyl or ethyl and the other group is an oligomer of the $C_3$–$C_5$-olefin. The number of carbon atoms in the polyolefin is from 35 to 350. In a preferred embodiment of the invention, the number of carbon atoms is from 45 to 250. In a further preferred embodiment of the invention, the proportion of structural units C) is from 1 to 20 mol %, in particular from 2 to 15 mol %.

The polyolefins on which the structural units C) are based are accessible by ionic polymerization and are available as commercial products (for example ®Ultravis, ®Napvis, ®Hyvis and ®Glissopal) (polyisobutenes from BP and BASF with different alkylvinylidene contents and molecular weights).

The mean molecular weights of the copolymers according to the invention are generally from 1500 to 200,000 g/mol, primarily from 2000 to 100,000 g/mol, and preferably from 5000 to 200,000 g/mol (GPC against polystyrene standard in THF).

The copolymers according to the invention are preferably prepared at temperatures of from 50 to 220° C., in particular from 100 to 190° C., especially from 130 to 170° C. The preferred preparation process is solvent-free bulk polymerization, but it is also possible to carry out the polymerization in the presence of aprotic solvents, such as toluene or xylene, or solvent mixtures, such as kerosene or solvent naphtha.

Particular preference is given to polymerization in aliphatic or isoaliphatic solvents which provide a low degree of moderation. In the case of solvent polymerization, the temperature can be set particularly simply via the boiling point of the solvent or by working under an excess or reduced pressure.

The reaction of the monomers is initiated by free-radical-forming initiators (free-radical chain initiators). This class of substances includes, for example, oxygen, hydroperoxides, peroxides and azo compounds, such as cumene hydroperoxide, t-butyl hydroperoxide, dilauroyl peroxide, dibenzoyl peroxide, bis(2-ethylhexyl) peroxide carbonate, t-butyl perpivalate, t-butyl permaleate, t-butyl perbenzoate, dicumyl peroxide, t-butylcumyl peroxide, di(t-butyl) peroxide, 2,2'-azobis(2-methylpropionitrile) or 2,2'-azobis (2-methylbutyronitrile). The initiators are employed individually or as a mixture of two or more substances in amounts of from 0.01 to 20% by weight, preferably from 0.05 to 10% by weight, based on the monomer mixture.

The copolymers can be prepared by copolymerization of polyolefin (component C) and α-olefin (component B) with either itaconic or maleic anhydride or maleic, fumaric or itaconic esters. If a copolymerization is carried out with anhydrides, the copolymer formed is esterified after the preparation. This esterification is carried out, for example, by reaction with from 1.5 to 2.5 mol of alcohol per mol of anhydride at from 50 to 300° C., in particular from 120 to 250° C. The water of reaction can be distilled off by means of a stream of inert gas or removed by azeotropic distillation. Copolymers having acid numbers of less than 50 mg of KOH/g, in particular less than 30 mg of KOH/g, especially less than 20 mg of KOH/g, are preferred.

The invention furthermore relates to the use of the copolymers according to the invention as additives for fuel oils for improving the cold-flow properties of these fuel oils.

The invention furthermore relates to fuel oils comprising the copolymers according to the invention.

The copolymers according to the invention are added to mineral oils or mineral-oil distillates in the form of solutions or dispersions. These solutions or dispersions preferably comprise from 1 to 90% by weight, in particular from 5 to 80% by weight, of the mixtures. Suitable solvents or dispersion media are aliphatic and/or aromatic hydrocarbons or hydrocarbon mixtures, for example gasoline fractions, kerosene, decane, pentadecane, toluene, xylene, ethylbenzene or commercial solvent mixtures, such as solvent naphtha, ®Shellsol AB, ®Solvesso 150, ®Solvesso 200, ®Exxsol, ®ISOPAR and ®Shellsol D grades, and aliphatic or aromatic alcohols, ethers and/or esters. The solvent mixtures mentioned contain various amounts of aliphatic and/or aromatic hydrocarbons. The aliphatics may be straight-chain (n-paraffins) or branched (iso-paraffins). Aromatic hydrocarbons may be mono-, di- or polycyclic and may, if desired, carry one or more substituents. Mineral oils or mineral-oil distillates whose rheological properties have been improved by the copolymers according to the invention contain from 0.001 to 2% by weight, preferably from 0.005 to 0.5% by weight, of the copolymers, based on the distillate.

For the preparation of additive packages for specific problem solutions, the copolymers may also be employed together with one or more oil-soluble co-additives which per se improve the cold-flow properties of crude oils, lubricant oils or fuel oils. Examples of such co-additives are copolymers or terpolymers of ethylene containing vinyl esters, alkylphenol-aldehyde resins and polar compounds which effect paraffin dispersion (paraffin dispersants).

Thus, mixtures of the copolymers according to the invention which have proven highly successful are those with copolymers containing from 10 to 40% by weight of vinyl acetate and from 60 to 90% by weight of ethylene. Other suitable flow improvers are copolymers of ethylene with one or more $C_1$–$C_{30}$-alkylvinyl esters, $C_1$–$C_{30}$-alkyl (meth) acrylates and/or olefins. Particularly suitable are vinyl acetate, vinyl propionate, vinyl butyrate, vinyl hexanoate, vinyl octanoate, vinyl neodecanoate, vinyl neononanoate, methyl acrylate, ethyl acrylate, 2-ethylhexyl acrylate, lauryl acrylate, stearyl acrylate and the corresponding esters of methacrylic acid. Suitable olefins are, for example, propene, isobutylene, diisobutylene, 4-methylpentene and nobornene. Similarly, it is possible to employ mixtures of different flow improvers of different quantitative (for example comonomer content) and/or qualitative composition (type of copolymers/terpolymers, molecular weight, degree of branching).

In a preferred embodiment of the invention, the copolymers according to the invention are employed as a mixture with ethylene-vinyl acetate-vinyl neononanoate terpolymers or ethylene-vinyl acetate-vinyl neodecanoate terrpolymers in order to improve the flowability of mineral oils or mineral-oil distillates. Besides ethylene, the terpolymers of vinyl neononanoate or vinyl neodecanoate contain from 10 to 35% by weight of vinyl acetate and from 1 to 25% by weight of the respective neo compound.

In a further preferred embodiment of the invention, the copolymers are employed with terpolymers which, besides ethylene, contain from 10 to 35% by weight of vinyl esters and from 0.5 to 20% by weight of olefins, such as, for example, diisobutylene, hexene, 4-methylpentene and/or norbornene.

The mixing ratio between the copolymers according to the invention and the above-described ethylene-vinyl acetate copolymers or the terpolymers of ethylene, vinyl acetate and the vinyl esters of neononanoic or neodecanoic acid or of ethylene, vinylidene and olefins is (in parts by weight) from 20:1 to 1:20, preferably from 10:1 to 1:10. The mixtures of the copolymers according to the invention with said copolymers are particularly suitable for improving the flow properties of middle distillates.

Furthermore, the copolymers according to the invention can be employed as a mixture with alkylphenol-formaldehyde resins. In a preferred embodiment of the invention, these alkylphenol-formaldehyde resins are those of the formula 5

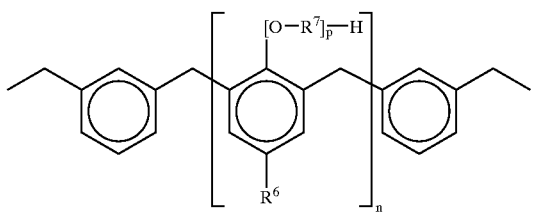

(5)

in which $R^6$ is $C_4$–$C_{50}$-alkyl or -alkenyl, $R^7$ is ethoxy and/or propoxy, n is a number from 5 to 100, and p is a number from 0 to 50.

Paraffin dispersants reduce the size of the paraffin crystals and have the effect that the paraffin particles do not deposit, but instead remain colloidally dispersed with significantly reduced sedimentation tendency. Successful paraffin dispersants have proven to be oil-soluble polar compounds containing ionic or polar groups, for example amine salts and/or amides obtained by reaction of aliphatic or aromatic amines, preferably long-chain aliphatic amines, with aliphatic or aromatic mono-, di-, tri- or tetracarboxylic acids or their anhydrides. Other paraffin dispersants are copolymers of maleic anhydride and α,β-unsaturated compounds, which can, if desired, be reacted with primary monoalkylamines and/or aliphatic alcohols, the products of the reaction of alkenylspirobislactones with amines and products of the reaction of terpolymers based on a,p-unsaturated dicarboxylic anhydrides, α,β-unsaturated compounds and polyoxyalkylene ethers of lower unsaturated alcohols. Alkylphenolformaldehyde resins are also suitable as paraffin dispersants.

The mixing ratio (in parts by weight) between the copolymers and the paraffin dispersants is in each case in the range from 1:10 to 20:1, preferably from 1:1 to 10:1.

The copolymers according to the invention are suitable for improving the cold-flow properties of crude oils, distillate oils or fuel oils, and lubricant oils. The oils can be of mineral, animal or vegetable origin.

Particularly suitable fuel oils, besides crude oils and residue oils, are middle distillates. The term middle distillates is applied, in particular, to mineral oils which have been obtained by distillation of crude oil and boil in the range from 120 to 500° C., such as, for example, kerosene, jet fuel, diesel and heating oil. They may contain some alcoholic fuel constituents, such as, for example, ethanol and methanol, or biofuels, such as, for example, rapeseed oil or rapeseed oil methyl ester. The fuels according to the invention preferably contain less than 350 ppm, especially less than 200 ppm, of sulfur. Their GC-determined content of n-paraffins having a chain length of 18 carbon atoms or more is at least 8 area-%, preferably greater than 10 area-%. Their 95% distillation point is preferably above 350° C., in particular above 370° C., especially above 380° C.

The copolymers can be used alone or together with other additives, for example dewaxing aids, conductivity improvers, antifoams, dispersion aids, corrosion inhibitors, antioxidants, lubricity improvers, dehazers or sludge inhibitors. The additive components can be added to the oils to which additives are to added jointly as a concentrate mixture in suitable solvents or alternatively separately.

EXAMPLES

Preparation and Characterization of the Additives Employed

The poly(olefins) employed are commercial products (®Ultravis) from BP Chemicals. The $C_{20/24}$-olefin employed is a mixture of 1-olefins containing, as principal components, 2% of $C_{18}$, 48% of $C_{20}$, 36% of $C_{22}$ and 7% of $C_{24}$.

General Preparation Procedure 1: Polymerization of MA with Olefins (P1 to P12)

The olefin/poly(isobutylene) mixture shown in the table is introduced into a round-bottomed flask fitted with stirrer, internal thermometer, reflux condenser, gas-inlet tube and two metering devices at 150–160° C. with stirring under a stream of nitrogen. Molten maleic anhydride and a solution of di-tert-butyl peroxide in kerosene are added continuously from separate flasks at such a rate that the maximum temperature shown in Table I is observed, which takes around 1–1.5 hours. The mixture is allowed to react for a further 2 hours at 150° C. and then discharged.

TABLE 1

Preparation examples polymerization

| Example | Mol of MA | Olefin mol | Chain length | Poly(olefin) mol | Mw | $T_{max}$ |
|---|---|---|---|---|---|---|
| P1 | 1.0 | 0.9 | $C_{20/24}$ | 0.1 | 800 | 160° C. |
| P2 | 1.0 | 0.9 | $C_{20/24}$ | 0.1 | 1300 | 160° C. |
| P3 | 1.0 | 0.95 | $C_{20/24}$ | 0.05 | 1300 | 160° C. |
| P4 | 1.0 | 0.9 | $C_{18}$ | 0.1 | 800 | 170° C. |
| P5 | 1.0 | 0.8 | $C_{18}$ | 0.2 | 800 | 170° C. |
| P6 | 1.0 | 0.7 | $C_{18}$ | 0.3 | 800 | 170° C. |
| P7 | 1.0 | 0.9 | $C_{18}$ | 0.1 | 1300 | 170° C. |
| P8 | 1.0 | 0.8 | $C_{18}$ | 0.2 | 1300 | 170° C. |
| P9 | 1.0 | 0.7 | $C_{18}$ | 0.3 | 1300 | 160° C. |
| P10 (comp.) | 1.0 | 1.0 | $C_{20/24}$ | — | | 160° C. |
| P11 (comp.) | 1.0 | 1.0 | $C_{20/24}$ | — | | 190° C. |
| P12 (comp.) | 1.0 | 1.0 | $C_{18}$ | — | | 170° C. |

TABLE 2

Viscosity behavior of the MA-olefin copolymers and terpolymers
The viscosity is determined in accordance with ISO 3219 (B) using a rational viscometer (Haake RV 20) with plate-and-ball measurement system. The molecular weight is determined by gel permeation chromatography in THF against a polystyrene standard with RI detection.

| Example | Mw | $V_{160}$ | $V_{140}$ | $V_{120}$ |
|---|---|---|---|---|
| P1 | 5900 | 2.38 Pas | 14.08 Pas | >30 Pas |
| P2 | 8100 | 1.10 Pas | 3.38 Pas | 25 Pas |
| P3 | 5850 | 2.79 Pas | 13.20 Pas | >30 Pas |
| P4 | 5530 | 2.15 Pas | 9.35 Pas | >30 Pas |
| P5 | 5620 | 0.69 Pas | 1.28 Pas | 5.32 Pas |
| P6 | 5900 | 0.36 Pas | 0.71 Pas | 2.96 Pas |
| P7 | 5860 | 1.12 Pas | 3.56 Pas | 25 Pas |
| P8 | 7030 | 0.55 Pas | 0.89 Pas | 2.85 Pas |
| P9 | 6410 | 0.27 Pas | 0.35 Pas | 0.69 Pas |
| P10 (comp.) | 6050 | 4.69 Pas | 29.27 Pas | >50 Pas |
| P11 (comp.) | 3990 | 0.17 Pas | 0.36 Pas | 1.18 Pas |
| P12 (comp.) | 5460 | 4.39 Pas | 24.84 Pas | >50 Pas |

These viscosity measurements show that the flow and handling properties of the terpolymers according to the invention at low temperatures are guaranteed as in the case of known copolymers. Although the comparative sample P11, which was polymerized at low temperature, exhibits very low viscosity, it does not have comparable effectiveness (cf. Table 4).

General Preparation Procedure 2: Polymer-analogous Esterification

The MA copolymeriterpolymer is dissolved in equal parts by weight of solvent naphtha with gentle warming in a three-necked flask fitted with stirrer, internal thermometer and water separator. After the stated amounts of behenyl alcohol (native fatty alcohol containing, as principal components, 2% of octadecanol, 63% of eicosanol and 31% of docosane), tetradecanol, hexadecanol and/or alkoxylated behenyl alcohol per mol of copolymerized maleic anhydride have been added, the mixture is boiled under reflux (about 220° C.) for 12 hours, diluted with solvent naphtha to a polymer content of 50% and discharged.

TABLE 3

Preparation examples esterification

| Example | Polymer | Alcohol | Acid number |
|---|---|---|---|
| E1 | P1 | 1.6 mol behenyl alcohol | 14 |
| E2 | P2 | 1.6 mol behenyl alcohol | 13 |
| E3 | P3 | 1.6 mol behenyl alcohol | 14 |
| E4 (comp.) | P10 | 1.6 mol behenyl alcohol | 15 |
| E5 (comp.) | P11 | 1.6 mol behenyl alcohol | 15 |
| E6 | P4 | 2 mol tetradecanol | 15 |
| E7 | P4 | 1.6 mol tetradecanol | 13 |
| E8 | P5 | 2 mol tetradecanol | 13 |
| E9 | P6 | 2 mol tetradecanol | 16 |
| E10 | P7 | 2 mol tetradecanol | 15 |
| E11 | P8 | 2 mol tetradecanol | 18 |
| E12 (comp.) | P12 | 2 mol tetradecanol | 15 |
| E13 | P4 | 1 mol tetradecanol + 1 mol hexadecanol | 17 |
| E14 | P4 | 1.8 mol tetradecanol + 0.2 mol behenyl alcohol × 12 EO | 16 |
| E15 | P4 | 1.5 mol tetradecanol 0.5 mol behenyl alcohol | 15 |

Example E 16

0.5 mol of dibehenyl fumarate, 0.05 mol of poly(isobutylene) having a molecular weight of 800 and 0.45 mol of $C_{20/24}$-olefin are warmed to 140° C. in a multi-necked flask with stirring and under a stream of nitrogen. A solution of di-tert-butyl peroxide in kerosene is added at such a rate that the reaction temperature does not exceed 150° C. The mixture is stirred at 140° C. for a further 2 hours, diluted with an equal amount of solvent naphtha and discharged.

The esterified polymers are investigated for their effectiveness as pour point depressants in a residue oil having an inherent pour point of 45° C. The measurements are carried out in accordance with ISO 3016 using a Herzog MC 850 automatic pour point tester.

TABLE 4

Effectiveness of the esterified terpolymers as pour point depressant

| Example | 660 ppm | 1200 ppm |
|---|---|---|
| E1 | +36° C. | +30° C. |
| E2 | +36° C. | +30° C. |
| E3 | +33° C. | +30° C. |
| E16 | +33° C. | +30° C. |
| E4 (comp.) | +36° C. | +33° C. |
| E5 (comp.) | +45° C. | +36° C. |

The terpolymers according to the invention are furthermore suitable as co-additives (comb polymers) to ethylene copolymers in middle distillates, in particular in middle distillates having a high final boiling point (>370° C., in particular >380° C.) and/or a high cloud point (>0° C.).

TABLE 5

Characterization of the test oils
The boiling data are determined in accordance with ASTM D-86, the CFPP value in accordance with EN 116 and the cloud point in accordance with ISO 3015.

| | Test Oil 1 | Test Oil 2 |
|---|---|---|
| Initial boiling point [° C.] | 179 | 155 |
| 20% [° C.] | 242 | 212 |
| 90% [° C.] | 365 | 390 |
| 95% [° C.] | 388 | 402 |
| Cloud point [° C.] | +4.4 | +13 |
| CFPP [° C.] | −2 | +11 |

TABLE 6

CFPP effectiveness in Test Oil 1
The CFPP value is measured in accordance with EN 116. The flow improvers used are 4 parts by weight of a commercially available ethylene-vinyl acetate copolymer having a vinyl acetate content of 28% by weight and a melt viscosity of 320 mPas measured at 140° C., per part by weight of the ester according to the invention.

| Example | 100 ppm | 200 ppm | 300 ppm | 400 ppm |
|---|---|---|---|---|
| E6 | −12 | −15 | −18 | −18 |
| E7 | −13 | −14 | −15 | −18 |
| E8 | −10 | −16 | −16 | −19 |
| E9 | −6 | −5 | −8 | −12 |
| E10 | −12 | −16 | 16 | −19 |
| E11 | −5 | −14 | −16 | −17 |
| E12 (comp.) | −8 | −14 | −15 | −17 |
| E13 | −10 | −12 | −14 | −17 |
| E14 | −12 | −13 | −15 | −16 |
| E15 | −12 | −15 | −17 | −17 |

The effectiveness of the terpolymers according to the invention is superior to that of the corresponding copolymers at polyolefin contents in the olefin mixture of <30 mol %.

TABLE 7

CFPP effectiveness in Test Oil 2
The CFPP value is measured in accordance with EN 116. The flow improvers used are 2 parts by weight of a mixture of two commercially available ethylene-vinyl ester copolymers (terpolymer containing 31% by weight of vinyl acetate and 9% by weight of vinyl neononanoate and having a melt viscosity $V_{140}$, measured at 140° C., of 230 mPas, and ethylene-4-methylpentene-vinyl acetate terpolymer containing 24% of vinyl acetate and having a $V_{140}$ of 300 mPas) in a ratio of 3:1 per part by weight of the ester according to the invention.

| Example | 300 ppm | 500 ppm | 600 ppm | 1000 ppm |
|---|---|---|---|---|
| E6 | +2 | +2 | −2 | −6 |
| E11 (comp.) | +3 | +4 | +2 | −2 |
| E12 | +2 | −1 | −2 | −5 |
| E13 | +5 | +3 | −1 | −6 |

Phase Stability

Formulations of the polymers according to the invention diluted to 50% by weight with solvent naphtha were mixed with 4 parts of a commercially available 70% flow improver suspension (EVA copolymer containing 26% of vinyl acetate and having a $V_{140}$ of 280 mpas, and the mixture was homogenized by stirring for 30 minutes at 80° C. The samples stored at 50° C. were then checked visually for phase stability.

TABLE 8

| Sample | 2 days | days | 14 days |
| --- | --- | --- | --- |
| E6 | homogeneous | 1% sediment | 3% sediment |
| E7 | homogeneous | homogeneous | 0.5% sediment |
| E8 | homogeneous | homogeneous | homogeneous |
| E9 | homogeneous | homogeneous | 1% sediment |
| E10 | homogeneous | homogeneous | homogeneous |
| E11 (comp.) | 2% sediment | 6% sediment | 10% sediment |

The results demonstrate the improved phase stability of the polymers according to the invention in a blend with ethylene-vinyl ester copolymers owing to the incorporation of poly(isobutylene).

What is claimed is:

1. A copolymer for use as an additive to fuel oil to improve the cold-flow properties of the fuel oil, the copolymer containing
    A) from 45 to 54 mol % of divalent structural units of the formula 1

$$(H)_a-\underset{\underset{\underset{R^1}{O}}{\overset{\overset{O}{\|}}{C}}}{\overset{H}{\underset{|}{C}}}-\underset{\underset{\underset{R^1}{O}}{\overset{\overset{O}{\|}}{C}}}{\overset{(H)_b}{\underset{|}{C}}}- \quad (1)$$

in which a and b=0 or 1 and a+b=1,
    B) from 35 to 53 mol % of divalent structural units of the formula 2 derived from a linear α-olefin $$-H_2C-CHR^2- \quad (2)$$

and
    C) from 1 to 25 mol % of divalent structural units derived from polyolefins, where the polyolefins can be derived from monoolefins having 3 to 5 carbon atoms, wherein
    a) $R^1$ is an alkyl or alkenyl radical having 10 to 40 carbon atoms or an alkoxyalkyl radical having 1 to 100 alkoxy units and 1 to 30 carbon atoms in the alkyl radical, and
    b) $R^2$ is an alkyl radical having 10 to 50 carbon atoms,
    c) the polyfins on which the structural units C) are based have an alkylvinylidene content of at least 50 mol %, and
    d) the number of carbon atoms in the polyfin molecules on which the structural units C) are based is from 35 to 350.

2. A copolymer as claimed in claim 1, wherein $R^1$ is a radical of the formula 3

$$-(O-A)_x-R^3 \quad (3)$$

in which A is $C_2$–$C_4$-alkyl, x is a number from 1 to 100, and $R^3$ is $C_1$–$C_{30}$-alkyl.

3. A copolymer as claimed in claim 1, wherein the divalent structural units derived from polyolefins are derived from polypropylene or polyisobutylene.

4. A copolymer as claimed in claim 1, whose molecular weight is from 5000 to 2000 g/mol.

5. A method of using a copolymer containing
    A) from 45 to 54 mol % of divalent structural units of the formula 1

$$(H)_a-\underset{\underset{\underset{R^1}{O}}{\overset{\overset{O}{\|}}{C}}}{\overset{H}{\underset{|}{C}}}-\underset{\underset{\underset{R^1}{O}}{\overset{\overset{O}{\|}}{C}}}{\overset{(H)_b}{\underset{|}{C}}}- \quad (1)$$

in which a and b=0 and a+b=1,
    B) from 35 to 53 mol % of divalent structural units of the formula 2 derived from a linear α-olefin $$-H_2C-CHR^2- \quad (2)$$

and
    C) from 1 to 25 mol % of divalent structural units derived from polyolefins, where the polyolefins can be derived from monoolefins having 3 to 5 carbon atoms, wherein
    a) $R^1$ is an alkyl or alkenyl radical having 10 to 40 carbon atoms or an alkoxyalkyl radical having 1 to 100 alkoxy units and 1 to 30 carbon atoms in the alkyl radical, and
    b) $R^2$ is an alkyl radical having 10 to 50 carbon atoms,
    c) the polyolefins on which the structural units C) are based have an alkylvinylidene content of at least 50 mol %, and
    d) the number of carbon atoms in the polyolefin molecules on which the structural units C) are based is from 35 to 350; the method comprising adding the copolymer to a fuel oil or distillate oil to improve its cold-flow properties.

6. The method of using as claimed in claim 5, wherein the copolymer when $R^1=C_{10}$–$C_{24}$-alkyl is used as a cold-flow improver.

7. The method of using as claimed in claim 5, wherein the copolymer when $R^1=C_{16}$–$C_{40}$-alkyl is used as a pour point depressant.

8. A fuel oil containing from 0.001 to 2% by weight of one or more copolymers as claimed in claim 1.

* * * * *